July 4, 1967 R. NEUSCHOTZ 3,328,813
FORMATION OF ELEMENTS HAVING LOCKING KEYS
Filed April 20, 1964 2 Sheets-Sheet 1
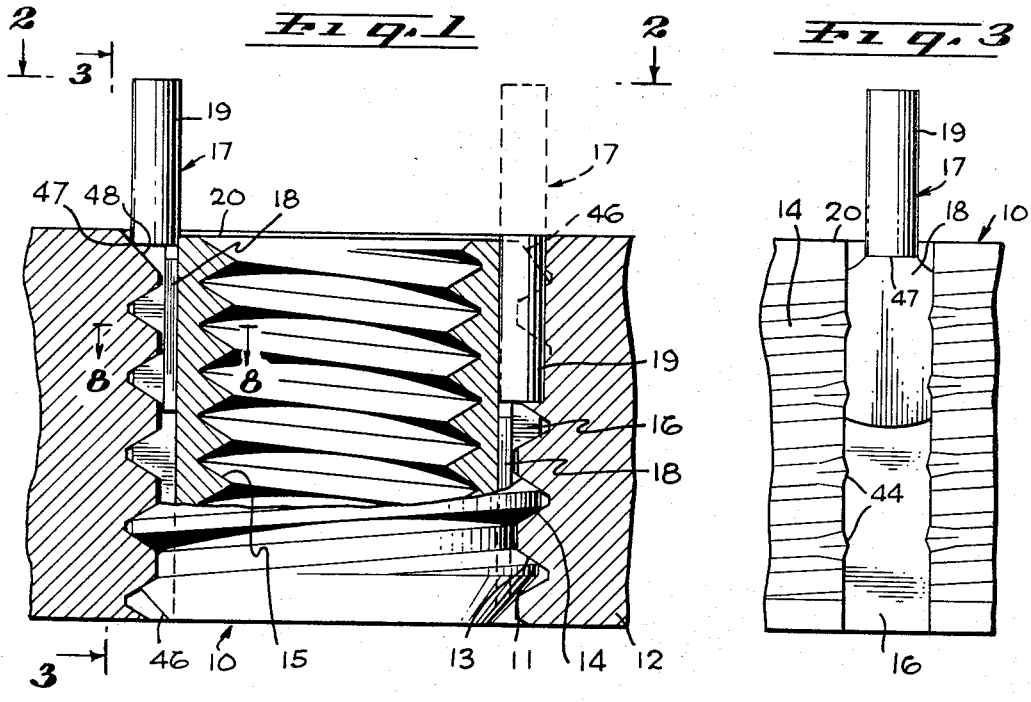
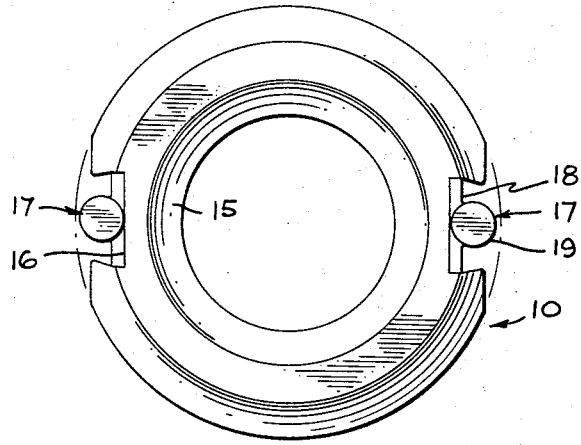
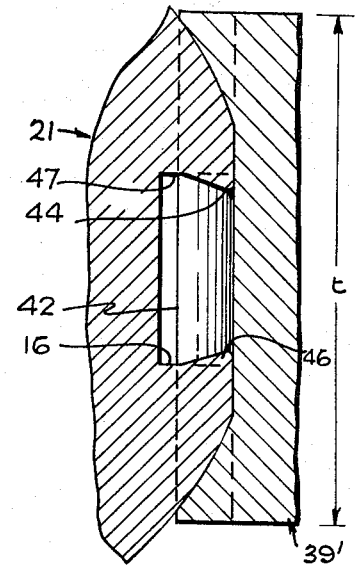
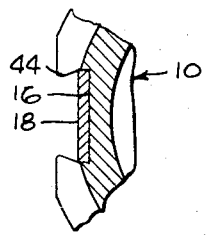
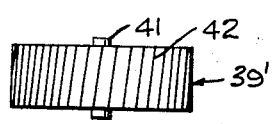
ROBERT NEUSCHOTZ
INVENTOR.
BY William P. Green
ATTORNEY July 4, 1967  R. NEUSCHOTZ  3,328,813
FORMATION OF ELEMENTS HAVING LOCKING KEYS
Filed April 20, 1964  2 Sheets-Sheet 2
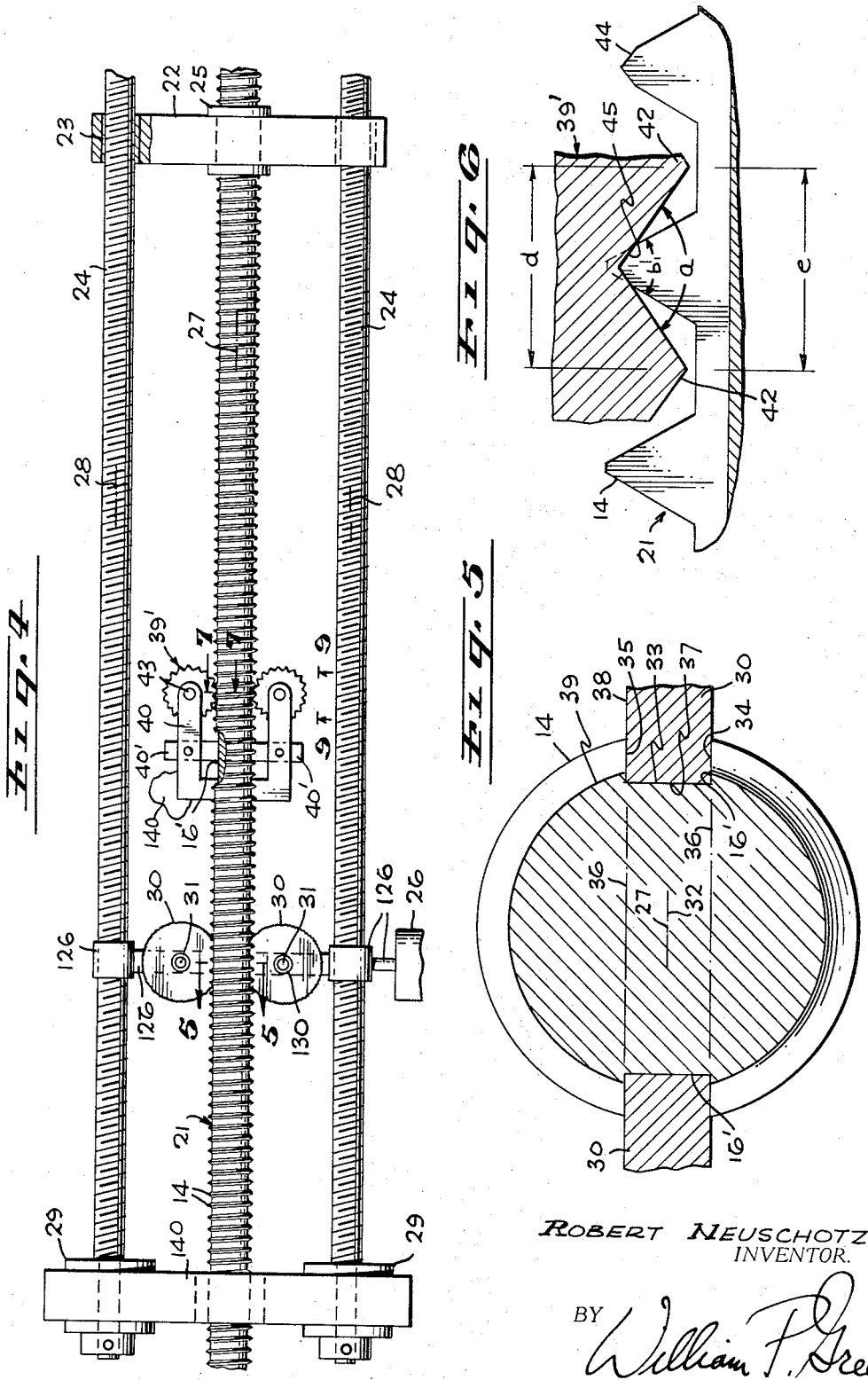
ROBERT NEUSCHOTZ
INVENTOR.
BY William P. Green
ATTORNEY United States Patent Office 3,328,813
Patented July 4, 1967

3,328,813
FORMATION OF ELEMENTS HAVING
LOCKING KEYS
Robert Neuschotz, 1162 Angelo Drive,
Beverly Hills, Calif. 90206
Filed Apr. 20, 1964, Ser. No. 361,086
9 Claims. (Cl. 10—72)

This invention relates to improved methods and apparatus for manufacturing threaded elements having locking keys, and to the structure of the elements thus produced.

The threaded elements with which the present invention is concerned are of a general type having external threads, with one or more grooves extending generally axially through those threads. A key is then mounted in each such groove, and is so constructed that, after the threaded element has been screwed into an internally threaded bore in a carrier part, the key may be driven axially relative to the element to form an interlock with the threads of the carrier part acting to positively lock the element against unscrewing rotation. The groove is shaped to have, in transverse cross section, an undercut or generally dovetail configuration, so that the key is effectively confined against radially outward movement relative to the element and out of the groove during handling of the element prior to installation. That is, the groove is shaped to decrease in width as it advances radially outwardly, with a portion of the key being received within the widened deeper portion of the groove, and being too wide for movement radially outwardly through or past the outer narrowed portion of the groove.

In the past, the formation of an undercut groove or keyway of this type in a threaded element or insert of the discussed character has entailed considerable difficulty and expense in manufacture, by reason of the necessity for employment of an axially moving broaching tool or the like to form the undercut. These broaching tools have the disadvantage of being easily breakable by reason of the small cross section which they must have to form the necessarily very narrow key receiving grooves, and in addition they are more difficult to handle than would be desired, may become worn relatively rapidly, and have various other disadvantages in use.

A major object of the present invention is to provide improved methods and apparatus which will enable the formation of a groove of the discussed type in the external threads of an insert or the like with much greater facility than has been possible in the past, and preferably without the necessity for the use of broaching tools. As will appear, the invention makes it possible, if desired, to utilize only rotary, rather than axially moving, tools in the formation of the undercut key receiving grooves. Also, the formation of the grooves may be performed in a continuous type of operation, in which an elongated piece of threaded metal stock has one or more undercut grooves formed through its threads as the stock is advanced axially along a predetermined path and through a forming machine.

The above advantages are attained in unique manner by first forming the groove to a preferably nonundercut cross section, and then deforming the crests of the external threads, adjacent the groove, in a manner giving the groove its desired undercut shape. The initial nonundercut groove may then be formed very easily by a simple rotary cutter positioned alongside the threaded stock, and progressively forming the groove during relative axial movement of the stock. The localized deformation of the thread crests, adjacent the groove, may be effected by another preferably rotary tool, which exerts force against the crests in a manner causing the desired deformation. This deforming tool desirably has teeth which interfit with the threads of the element being grooved, to maintain the general thread profile during the deformation, and to assure deformation primarily of only the desired crest locations. More particularly, the toothed tool employed for this purpose may be a simple knurling tool, which in effect rolls along the outer threaded surface of the element, adjacent the groove, and by such rolling action appropriately deforms the thread crests to give the groove its undercut cross section.

The above and other features and objects of the invention will be better understood from the following detailed description of the typical embodiment illustrated in the accompanying drawings, in which:

FIG. 1 is an axial section through a threaded insert constructed in accordance with the invention;
FIG. 2 is a plan view taken on line 2—2 of FIG. 1;
FIG. 3 is an enlarged side view of the insert taken on line 3—3 of FIG. 1;
FIG. 4 is a plan view of a machine for forming the undercut grooves in opposite sides of the insert of FIG. 1;
FIG. 5 is a section taken on line 5—5 of FIG. 4;
FIG. 6 is a greatly enlarged fragmentary representation of the manner in which the grooves are transformed to undercut cross section;
FIG. 7 is a transverse section taken on line 7—7 of FIG. 4;
FIG. 8 is a fragmentary section taken on line 8—8 of FIG. 1; and
FIG. 9 is fragmentary elevation on line 9—9 of FIG. 4.

Referring first to FIG. 1, I have shown at 10 a threaded insert manufactured by the process of the present invention, and illustrated as it appears after being screwed into a passage 11 in a carrier part 12. Passage 11 contains internal threads 13 which are dimensioned to mate with and threadedly receive the external threads 14 of insert 10. The insert may also contain internal threads 15 for receiving a coacting screw, bolt or the like, to connect that element to carrier part 12 through the medium of the insert.

As seen in FIG. 2, insert 10 has formed in its outer surface at least one axially extending groove 16, preferably two such grooves at diametrically opposite locations. These grooves extend axially through, and interrupt, the external threads 14 of the insert, and contain locking keys 17 adapted to be driven axially relative to the insert to lock the latter within the carrier part. The grooves 16 have the undercut or essentially dovetail cross section illustrated in FIG. 2, to effectively retain the keys within the grooves.

Each key 17 has an axially inner portion 18 which is very thin radially (see FIG. 8), and is a tight frictional fit within the radially innermost or deepest portion of the corresponding groove 16. Also, each key has an axially outer portion 19 which initially projects axially outwardly beyond the outer end surface 20 of the insert, and is radially thicker to project radially outwardly beyond portion 18. Thus, when the key is driven axially, to the full line position of the right-hand key in FIG. 1, portion 19 cuts through threads 13 of the carrier part in a manner forming an effective lock preventing unscrewing rotary motion of the insert.

With reference now to FIG. 4, a series of the inserts 10 of FIG. 1 are formed from an elongated piece of bar stock 21 which may initially be a solid rod of metal having external threads 14 (corresponding to threads 14 of FIG. 1) formed continuously along its entire length. This threaded bar stock is fed to the right through the apparatus of FIG. 4 for formation of grooves 16 therein. The bar stock may be advanced from left to right in FIG. 4 in any convenient manner, and at a predetermined uniform rate, as by means of one or more carriage elements 22 having nuts 23 at their opposite ends engaging two parallel lead screws 24 which are driven rotatably in unison. Each carriage element 22 may have a gripping portion 25 adapted to grip an end or other portion of the threaded bar stock 21 to cause advancement of the bar stock in correspondence with the advancement of nuts 23 resultant from rotation of the lead screws 24. A suitable motor 26 may drive both of the lead screws, with the advancement of stock 21 being along the longitudinal axis 27 of that stock. The lead screws may be mounted for rotation about their individual axes 28 by two axially spaced sets of bearings 29 (only one set shown).

As the threaded stock 21 advances to the right in FIG. 4, it first passes a pair of opposed rotary milling cutters 30 which are mounted to turn about two parallel axes 31 lying in a plane disposed transversely of axis 27. As seen in FIG. 5, these cutters engage diametrically opposite sides of the threaded stock 21, and lie essentially within a common plane 32 extending through and containing axis 27. The cutters form in the opposite sides of stock 21 a pair of grooves 16' extending axially of the stock, and parallel to axis 27, and typically having the rectangular transverse cross section illustrated in FIG. 5. More particularly, grooves 16' are defined by inner surfaces 33 disposed parallel to one another and parallel to axis 27, and by opposite side wall surfaces 34 and 35 lying in two generally parallel planes 36 extending parallel to and spaced equally at opposite sides of plane 32 and its contained axis 27. To form such rectangular grooves 16', each cutter 30 has peripheral cutting edges 37 extending parallel to the axis 31 of the cutter, and opposite side parallel cutting edges 38 extending radially with respect to axis 31. Cutters 30 may be driven rotatably by the same motor 26 which drives the lead screws, and at a predetermined rate of rotation relative to the advancement of stock 21 by the lead screws, the common drive from motor 26 to cutters 30 and screws 24 being represented diagrammatically at 126.

Preferably, each of the grooves 16' extends radially inwardly toward axis 27 slightly farther than the minor diameter 39 of threads 14, desirably a distance corresponding approximately to the radial thickness of portion 18 of key 17.

After the grooved stock 21 has passed cutters 30, it advances toward the location of a pair of deforming wheels 39', which may be shaped very much like conventional knurling tools. These wheels 39' are rotatably mounted to a supporting framework 40 for rotation about two individual axes 41 disposed parallel to one another and parallel to axes 31 of cutters 30. Support 40 may be mounted rigidly to a main stationary frame of the machine (shown fragmentarily at 140), which frame also mounts stationarily bearings 29, the bearings 130 for cutters 30, motor 26, and other fixed portions of the apparatus. Frame 40 may carry two stationary guide lugs 40' which project into and are shaped to fit closely but slidably within grooves 16', to prevent rotary motion of stock 21 about its axis, and assure proper positioning of the stock relative to wheels 39'. Lugs 40' may have a cross section the same as that illustrated for cutters 30 in FIG. 5. Peripherally, each of the wheels 39' has a series of circularly spaced teeth 42, which may have the cross section illustrated in FIG. 6, and which are spaced apart circularly a pitch distance d (FIG. 6) which is approximately the same as, and preferably substantially exactly the same as, the pitch distance e between corresponding portions of successive turns of the thread 14 on stock 21. Each deforming wheel 39' may have an axial thickness corresponding to that represented at t in FIG. 7, which thickness is greater than the width of groove 16', to engage and deform the threads for a substantial dimension at opposite sides of the groove. The teeth 42 of each wheel 39 have the cross section illustrated in FIG. 6 through the entire axial thickness t of the wheel, but with the teeth being disposed at a slight helical angularity corresponding to that of threads 14, to properly mesh with those threads (see FIG. 9). Alternatively, the teeth 42 of each wheel 39' may if desired extend directly parallel to the axis of that wheel, with that axis being disposed at a slight angle sufficient to align the projections 42 with the interthread grooves of threads 14.

The bearings 43 which mount wheels 39 for rotation relative to frame structure 40 maintain the two wheels 39' in a spaced relationship in which the grooved threaded stock cannot be forced through the space between the two wheels 39' without radially inward constriction or deformation of the crests of the threads directly adjacent grooves 16', to the condition illustrated at 44 in FIGS. 6 and 7. Thus, the two wheels 39' exert radially inward force against the thread crests, radially of axis 27, to deform the crests at 44 inwardly to a reduced diameter condition, and to a configuration corresponding to that defined by the valleys 45 (FIG. 6) between successive teeth 42 of wheel 39'. This localized radially inward deformation of the crests of the threads causes the material of those threads to also be deformed laterally into grooves 16' from the rectangular configuration of FIG. 5 to the undercut or essentially dovetail cross sectional configuration represented in FIG. 7. The overhanging laterally deformed portions of the crests labelled 46 in FIG. 7 form a reduced width radially outer portion of groove 16, which portion is substantially narrower than the radially inner portion 47 which may retain essentially the initial groove width, or at least is not narrowed as much as is the groove at the crest location 46. At the same time, however, the toothed cross sectional shape of the periphery of each wheel 39' maintains the thread turns in the deformed areas within the confines of essentially the initial thread profile, so that the deformed areas of the threads may still interfit properly with a mating internally threaded part, after completion of manufacture of the insert. For this purpose, the teeth 42 of wheels 39' may, at the locations of intertooth valleys 45, have their tooth faces at an angle $a$ (FIG. 6) which is substantially greater than the initial angularity $b$ between opposite side faces of thread 14 of the stock. Thus, the crests of the threads are deformed to the cross section illustrated at 44 in FIG. 6, while the root or radially inner portions of the threads may be essentially unaltered in shape.

After the stock has been grooved and deformed to the shape illustrated in FIG. 7, short lengths of the stock 21 are cut off, internally threaded, and chamfered at opposite ends of both sets of threads as indicated at 46 in FIG. 1; and the keys 17 are then installed within the undercut grooves 16 with their locking ends 19 projecting upwardly as viewed in FIG. 1. As mentioned previously, the fit of portion 18 of each key 17 within its associated undercut groove 16 is sufficiently tight to frictionally retain the key in its initial outwardly projecting position.

In using the insert, the insert is first screwed into carrier part 12 to the position illustrated in FIG. 1, with both of the keys in their upwardly projecting positions. In this condition, the upper thickened portions 19 of the keys present shoulders 47 at their axially inner ends which are engageable with countersink surface 48 of the carrier part to limit the extent to which the insert is screwed into the carrier part, preferably at a position in which the insert is inset slightly beyond a flush condition. When the insert reaches this condition, keys 17 are driven downwardly relative to the insert body and the carrier part, and to the full line position of the righthand key in FIG. 1, to cut into or through internal threads 13 of the carrier part and thereby form a lock preventing unscrewing rotation of the insert.

I claim:

1. The method that includes forming in an element having external threads disposed about an axis a groove extending generally axially through said threads, rolling over said threads adjacent said groove a rotary member which rolls relative to said element generally axially of the threads and which in rolling turns about a second axis disposed generally transversely of said axis of the threads, said member having teeth spaced about said second axis and having intermediate valley portions between the teeth, successively rolling different ones of said teeth into positions of projection between different turns of said threads as said member rolls relative to said element, successively rolling different ones of said intermediate valley portions into contact with the crests of successive turns of said threads as said member rolls relative to said element, exerting force against the crests of said thread turns successively at locations adjacent said groove by said valley portions of the rotary member, and thereby locally deforming said thread crests at said locations adjacent the groove radially inwardly in a manner decreasing the width of the groove at said crests to a width less than that deeper within the groove to give the groove an undercut cross section.

2. The method as recited in claim 1, in which said teeth are of a radial depth less than that of said threads.

3. The method as recited in claim 1, in which said groove initially is of essentially uniform width along its entire length and throughout its entire radial depth.

4. The method that includes advancing along an axis an element having external threads disposed essentially about said axis, progressively forming, during said advancement, two grooves extending generally axially through said threads at opposite sides of the element, then forcing said grooved threaded element, during said advancement, between two opposed rotary knurling tools which are mounted to turn about axes disposed generally transversely of and offset to opposite sides of said first mentioned axis, said tools having teeth spaced about their axes and having intermediate valley portions between the teeth, successively rolling different ones of said teeth into positions of projection between different turns of said threads as said tools turn, successively rolling different ones of said intermediate valley portions into contact with the crests of successive turns of said threads at locations adjacent said grooves as said tools turn, exerting force against the crests of said thread turns successively at locations adjacent and at opposite sides of said grooves by said valley portions of said tools, and thereby locally deforming said thread crests at said locations adjacent the groove radially inwardly in a manner decreasing the width of the grooves at said crests to a width less than that deeper within the grooves to give the grooves an undercut cross section.

5. Apparatus comprising means for forming in an element having external threads disposed about an axis a groove extending generally axially through said threads, a rotary member having a circularly extending series of teeth and having intermediate valley portions, and means for rolling said member over said threads adjacent said groove and generally axially of the threads with said member turning about a second axis disposed generally transversely of said axis of the threads, and with different ones of said teeth rolling successively into positions of projection between different turns of said threads as the member rolls, and with different ones of said valley portions successively contacting the crests of different turns of the threads and thereby locally deforming the crests adjacent the groove radially inwardly in a relation decreasing the width of the groove at said crests to a width less than that deeper within the groove to give the groove an undercut cross section.

6. Apparatus as recited in claim 5, in which said groove forming means include means for advancing said element axially along a path, and a rotating power driven cutter at a location along said path operable to progressively mill said groove in said element, said rotary member being positioned beyond said cutter along path.

7. Apparatus as recited in claim 5, in which said teeth on said rotary member are of a pitch corresponding essentially to that of said threads but of a radial depth essentially less than that of said threads.

8. Apparatus as recited in claim 6, in which there are two of said power driven rotary cutters at opposite sides of said path for milling two diametrically opposed grooves in said element, there being two of said toothed rotary members beyond said cutters and between which said element is forced and acting to locally engage and deform inwardly the crests of said threads adjacent said two grooves and thereby give the grooves localized undercut cross sections.

9. Apparatus for deforming an element having external threads disposed about an axis and having a groove extending generally axially through said threads, comprising a rotary member having a circularly extending series of teeth and having intermediate valley portions, and means for rolling said member over said threads adjacent said groove and generally axially of the threads with said member turning about a second axis disposed generally transversely of said axis of the threads, and with different ones of said teeth rolling successively into positions of projection between different turns of said threads as the member rolls, and with different ones of said valley portions successively contacting the crests of different turns of the threads and thereby locally deforming the crests adjacent the groove radially inwardly in a relation decreasing the width of the groove at said crests to a width less than that deeper within the groove to give the groove an undercut cross section.

References Cited

UNITED STATES PATENTS

| 2,254,413 | 9/1941 | Battershell | 83—470 |
| 2,520,121 | 8/1950 | Brutus | 151—7 |
| 2,855,970 | 10/1958 | Neuschotz | 151—23 |
| 2,956,293 | 10/1960 | McKay et al. | 10—10 |
| 3,020,570 | 2/1962 | Wallace et al. | 151—7 |
| 3,076,208 | 2/1962 | Moore | 10—10 |
| 3,099,071 | 7/1963 | Moore | 10—10 |
| 3,182,702 | 5/1965 | Nason et al. | 151—7 |
| 3,233,258 | 2/1966 | Neuschotz | 10—86 |

CARL W. TOMLIN, *Primary Examiner*,

R. S. BRITTS, *Assistant Examiner*.